(12) United States Patent
Asbeck et al.

(10) Patent No.: US 10,870,198 B1
(45) Date of Patent: Dec. 22, 2020

(54) BACK EXOSKELETON TO ASSIST LIFTING

(71) Applicant: Virginia Tech Intellectual Properties, Inc., Blacksburg, VA (US)

(72) Inventors: Alan Asbeck, Blacksburg, VA (US); Sarah E. Chang, Blacklsburg, VA (US); Jack Geissinger, Blacksburg, VA (US); Taylor Pesek, Christiansburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 325 days.

(21) Appl. No.: 15/464,616

(22) Filed: Mar. 21, 2017

(51) Int. Cl.
*B25J 9/00* (2006.01)
*A61H 3/00* (2006.01)

(52) U.S. Cl.
CPC ............ *B25J 9/0006* (2013.01); *A61H 3/00* (2013.01)

(58) Field of Classification Search
CPC ............ A61H 3/00; A61F 2/68; B25J 9/0006
See application file for complete search history.

(56) References Cited

U.S. PATENT DOCUMENTS

| | | | |
|---|---|---|---|
| 1,008,500 A | 11/1911 | Thornton | |
| 1,409,326 A | 3/1922 | Williamson | |
| 1,812,529 A | 6/1931 | Haulbrook et al. | |
| 1,202,851 A | 10/1936 | Kelly | |
| 2,906,260 A | 9/1959 | Myers | |
| 3,570,011 A | 3/1971 | Naig | |
| 5,709,648 A | 1/1998 | Webb | |
| 5,816,251 A | 10/1998 | Glisan | |
| 5,860,944 A | 1/1999 | Hoffman, Jr. | |
| 2015/0173993 A1* | 6/2015 | Walsh | A61H 1/024 414/4 |
| 2016/0081839 A1* | 3/2016 | Hassel | A61F 5/0113 602/28 |

FOREIGN PATENT DOCUMENTS

FR 2868287 10/2005

* cited by examiner

*Primary Examiner* — Jason-Dennis N Stewart
(74) *Attorney, Agent, or Firm* — Keith A. Vogt; Keith Vogt, Ltd.

(57) ABSTRACT

An exoskeleton to assist a user in moving as object comprising an upper body harness, a mid-body harness, and a lower body harness. First and second sets of elongated energy return members are located between the harnesses and are used to assist a user in moving an object.

5 Claims, 3 Drawing Sheets

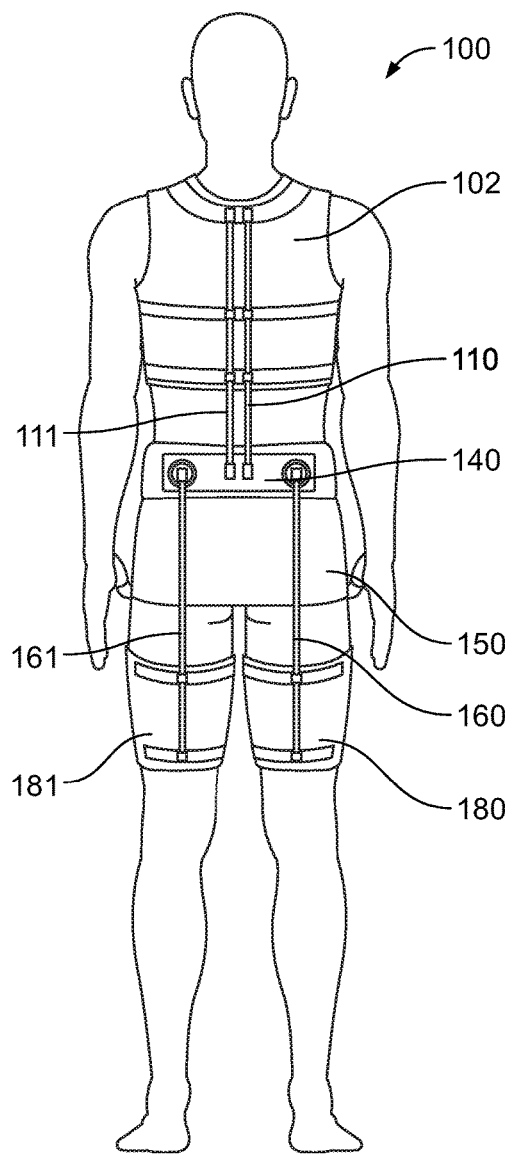
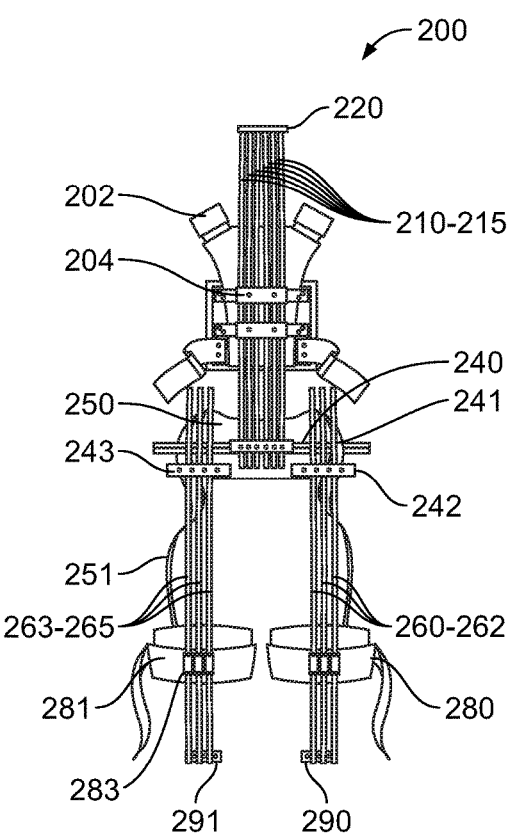
FIG. 1
FIG. 2

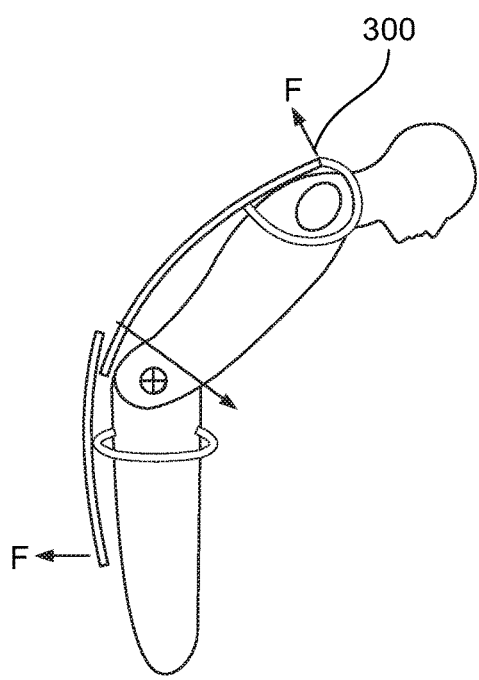
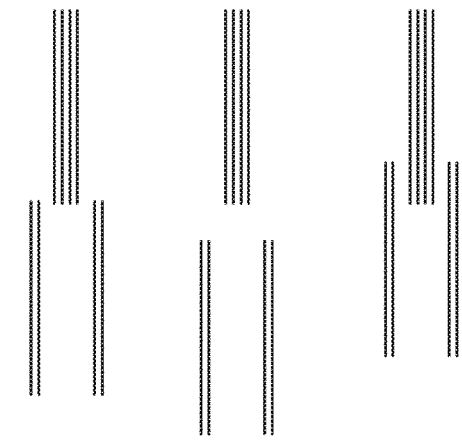
Option 1: In-line  Option 2: Vertical gap between back and leg carbon fiber  Option 3: Overlap between the back and leg carbon fiber
FIG. 3  FIG. 4
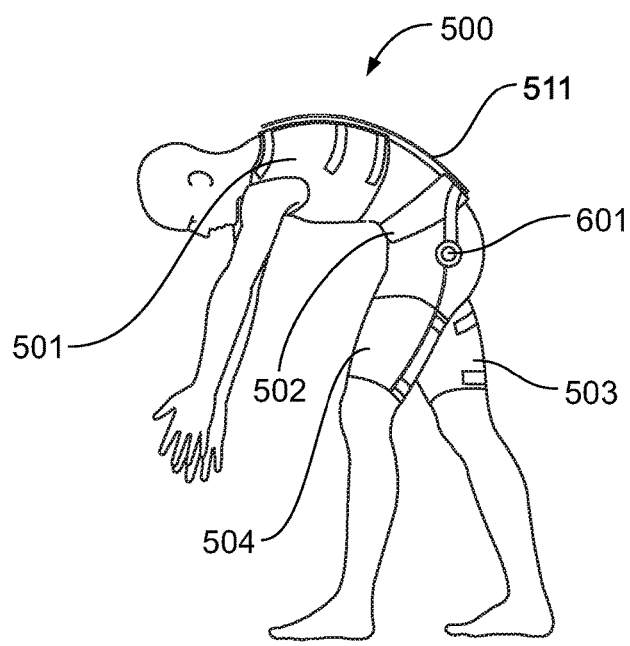
FIG. 5A

__US 10,870,198 B1__

BACK EXOSKELETON TO ASSIST LIFTING

RELATED APPLICATIONS

Not applicable.

STATEMENT REGARDING FEDERALLY SPONSORED RESEARCH & DEVELOPMENT

Not applicable.

INCORPORATION BY REFERENCE OF MATERIAL SUBMITTED ON A COMPACT DISC

Not applicable.

BACKGROUND OF THE INVENTION

The present invention relates generally to the field of material handling systems and, more particularly, to the field of exoskeletons that are worn by their wearers and allow for carrying of loads by the users.

BRIEF SUMMARY OF THE INVENTION

In one embodiment, the present invention provides an exoskeleton is useful for applications require bending and lifting of objects. These include unloading boxes from a truck, placing items onto shelves, delivering packages, picking agriculture, with the patient's, constructing buildings or other structures, and others.

In a preferred embodiment, the present invention provides an exoskeleton that offloads the weight of the wearer's torso, enabling them to pick up objects up to around 25-30% of their body weight without additional strain or enabling them to use minimal energy to bend forward and straight again.

In yet other embodiments, the inventions described here are variants of a simple, low-cost exoskeleton that can assist its wearer in lifting objects or bending over. The embodiments of the present invention have applications in moving boxes from one location to another, stocking shelves, picking crops or agriculture, bending over to inspect items on the ground, lifting objects in construction, lifting heavy patients as a nurse, and other applications. Once affixed to a user, which may be through the use of hip, by, and shoulder straps, the energy return of this exoskeleton is provided by one or more energy return members, which may be in the form of one or more carbon fiber rods, spines or bars. Thus, while lifting boxes usually causes lower back pain and high levels of spinal compression, the embodiments of the present invention utilize an energy return member for a high-energy return that reduces the levels of forces endured by the back.

In other embodiments, the present invention is completely passive; lifting in a user's natural poses will only be enhanced by the use of the exoskeleton and not restricted.

In other embodiments, the present invention provides an exoskeleton that can be utilized for moving boxes. Squat lift will receive the most energetic return due to the fact that the back-carbon fiber and the leg carbon fiber will deflect in conjunction more so than for a stoop lift.

In yet other embodiments, the present invention provides one or more energy return members which may be in the form of a leaf spring that is designed to offset weight of a wearer's torso when they bend forward at the waist. When they do a squat, the device additionally helps them stand straight again. The force to support the torso when bending at the waist is less than the force to raise their entire body mass when they squat.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

FIG. 1 provides a back view for one embodiment of the present invention.

FIG. 2 illustrates another embodiment of the present invention.

FIG. 3 illustrates the forces acting on an embodiment of the present invention.

FIG. 4 illustrates possible arrangements of the energy return members.

FIGS. 5A and 5B show yet another embodiment of the present invention.

DETAILED DESCRIPTION OF THE INVENTION

Figure 5B:
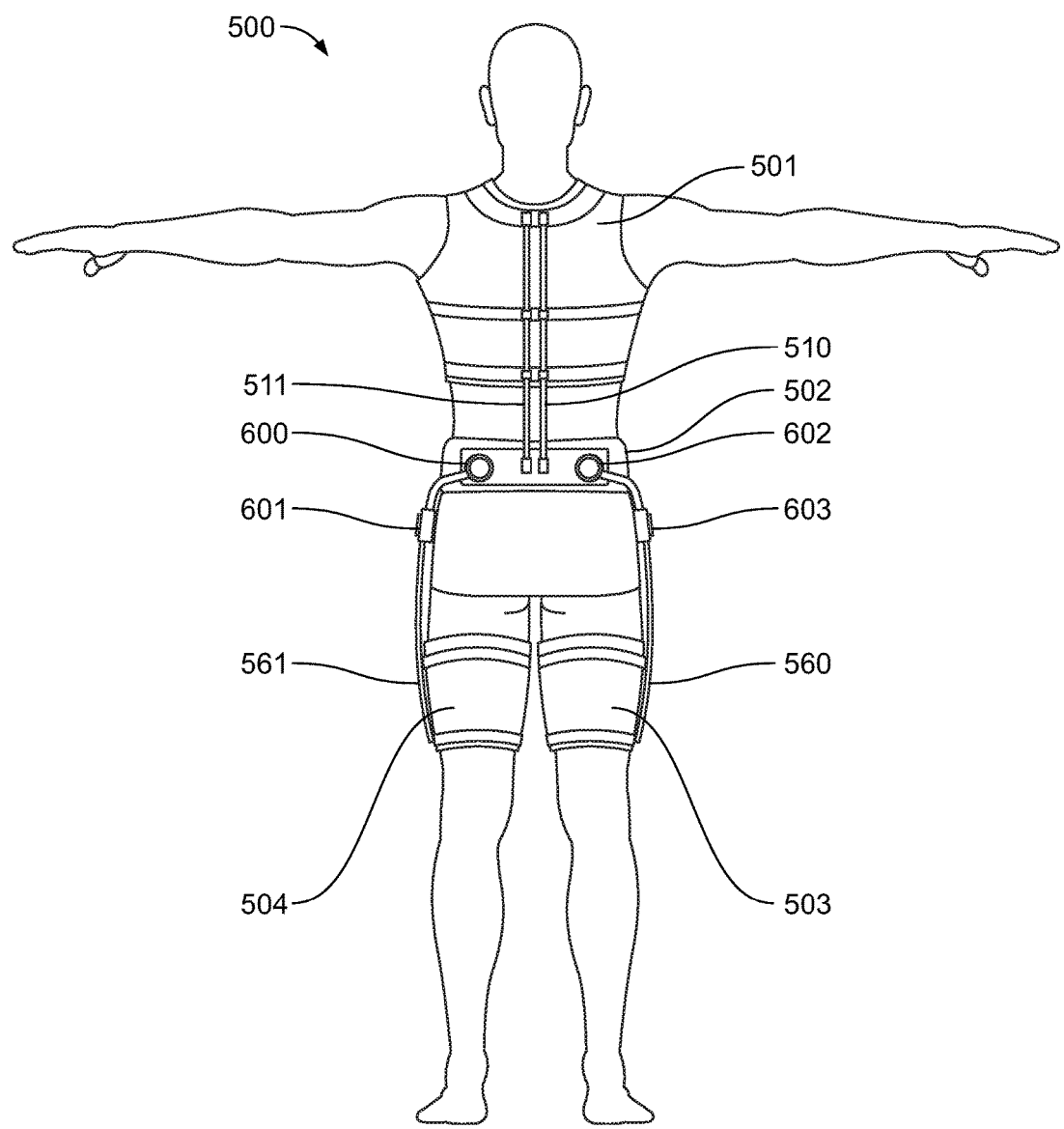

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

In a preferred embodiment, the present invention provides an exoskeleton system 100 that includes a chest harness 102, one or more energy return members 110-111, a rigid member 140 for securing the return members, a waist belt or harness 150, lower energy return members 160-161 and by braces or harnesses 180-181.

FIG. 2 illustrates another embodiment of the present invention which provides exoskeleton system 200. System 200 includes chest harness 202, which includes a rigid member 204 which may be a tough one sheet over aluminum which is used to secure energy return members 210-215 which may be carbon fiber. Stopper 220 maintains the alignment of the energy return members.

Chest harness 202 may include in a preferred design shoulder straps which are attached to the energy return members. In addition, backpack straps are connected to shoulder cuffs which are connected to the carbon fiber beams at the back. The shoulder cuffs ensure that the force applied from the carbon fiber is tangent to the top of the shoulder. The straps may be positioned to cross the chest to ensure that pinching is minimized while wearing the suit.

Also provided is member 240 which may be original bar across the back of waist belt 250 is used to secure energy return members 210-215. Member 240 also includes pivot 241 for motion in the frontal plane. Also provided are lower energy return member clamps 241 and 243.

Energy return members 260-265 are positioned along the legs of user. As discussed above, they are affixed to member 240 through the use of clamps 242 and 243 as well as straps 251. The energy return members are further affixed by braces 280-281. Also included are stoppers 290 and 291.

Straps 251 may extend from the waist belt to the side of the thigh brace. This keeps the thigh brace from slipping down the leg. The Thigh extends around the thigh.

The stoppers on top and bottom may be arranged to only attach to one layer of carbon fiber so the adjacent layers can slide relative to them and each other. The stoppers also hold the carbon fiber beams parallel to each other. There could be a cover placed over the carbon fiber pieces, made from cloth, plastic, or some other material to keep them enclosed and in the unlikely event that something breaks.

The pivot for motion in the frontal plane could be aligned with the center bar in the back of the waist belt. It may be beneficial to have the leg carbon fiber pieces offset front-back from the waist belt so that the pieces could rotate 180 degrees out to the side, so that the leg pieces are now parallel to and adjacent to the back carbon fiber pieces. This would be useful for storage or as one possible mechanism that would enable the user to sit down. Another possible mechanism for attaching the leg carbon fiber pieces to a plate is to use clamps to hold many carbon fiber pieces in a stack in "channels" in the structure. Bearings may be provided to permit the leg pieces which may be attached to the two to move smoothly with respect to the back structure (the wide part in the center holds the carbon fiber for the back).

A method of permitting sitting down it is to configure the carbon fiber at the back to be attached to a rigid element that extends to the side of the body. At the side of the body, there is a pivot point, and then another rigid element that extends to the back of the legs again. The vertical leaf springs (carbon fiber or other) that extend down the thighs are located at the back of the legs. The pivot at the side of the leg is prevented from rotating during normal operation with a latch at the side of the body or possibly at the back of the person. The above structure could also provide the wearer the ability to walk or lift their knees up while wearing the exoskeleton. The ability of the side pivot to move or remain locked or stationary could be controlled in several ways. One way is to connect the two legs with cables, either through a cable passing over pulleys or through a Bowden cable. In this case, the legs would be connected via a differential mechanism such that if one leg moves backward, the other is allowed to move forward; only when the torso is moved relative to the legs is there force created in the exoskeleton.

A possible way of permitting the leg pieces to move with respect to the back piece it is to provide two "lower metal plates" that connect to the "top metal plate" with a pivot located close to the wearer's hip joint in the sagittal plane. The leg carbon fiber pieces connect to the lower metal plates. This configuration could also include a pivot of the leg pieces with respect to the lower metal plates.

Another possible way to have a differential between the two legs is to have a cable connecting them which passes over pulleys. An alternative would be to have a Bowden cable connecting the two legs, with the sheath extending from the bottom edge of the green piece directly above one leg to the bottom edge of the green piece above the other leg. The inner cable would connect to the purple pieces as drawn above and then go through the Bowden cable. A variant is to connect the cables on the side of the leg or anywhere in between. There could also be a latch connecting the pieces in a rigid, robust manner if they were folded back up. This would provide the function where the legs could be released from the back, allowing the wearer to sit down, but would not provide walking functionality.

In other embodiments, the present invention provides an option to permit walking by providing a differential mechanism between the legs, so that if one leg goes forward and the other goes back then there is no force but if they both go back (as in a stoop or squat lift with both feet next to each other) then a force is created. This can be done with a cable connecting the two legs, a gear differential, or another means.

Another option for controlling bending is to have a clutch or other mechanism detect if the wearer's torso is leaning forward or not, and control if a side pivot moves or not based on the torso's angle. If their torso is vertical or close to vertical, the side pivots should be able to move freely or have one stiffness, while if their torso moves forward then the side pivots should have a different stiffness (possibly as a function of the torso angle). This feature could be applied to any design including a pivot on the side of the leg.

Some ways of implementing this are by using an electronic clutch controlled by an accelerometer or inertial measurement unit (IMU) that detects if the wearer is leaning their torso forward or not, and causes an electronic clutch to lock the side pivot (or cable connecting the back elements to the leg elements) or permit it to move freely. A mechanical clutch could lock based on something being pulled downward by gravity and, when the torso moves forward, this movable element locks with something else.

In yet another embodiment, a weighted mass will try to remain vertical due to gravity. When the torso elements tilt sideways, that will cause the mass to move to one side which will in turn tighten a spring in a spring-wrap clutch. Similarly if there is a weighted mass that remains vertical due to gravity but in this case when it swings, a protrusion on the end of the mass engages a gear that keeps the gear from rotating. The gear is inside a spool which will release or wind up cable. A spring causes the cable to retract with a small force at all times when it is not locked by the gear. The cable could extend downward from the back elements to the leg elements (from the green piece to the purple pieces in the pictures above). Each leg could have its own cable but a single clutch could engage or disengage both legs at the same time.

Finally, a pneumatic valve could open or shut based on either a mechanical sensor or electronic sensor to detect torso lean. This pneumatic valve could permit gas to flow into or out of a gas spring, so that when the valve is closed, the gas spring provides force, and when the valve is open, the gas spring moves freely. This gas spring could be placed across the side pivot so that it creates a force across the joint.

Another possible mechanism to permit sitting down involves a linkage that swivels the leg carbon fiber pieces from being positioned at the back of the person to being positioned at the side of the person. This could be implemented in conjunction with springs to return the carbon fiber to the rear of the person, and a latch or over-centered linkage to hold them in place at the sides of the body. Still another option to permit sitting is is to use sliders to permit the leg beams to extend outward from the back and around to the sides of the body.

In yet other embodiments, the present invention provides a shelf supporting a box while carrying it. The shelf or ledge would be installed across the front of the hips to assist with carrying boxes of various sizes. Ideally, it would be only 1-6" out from the user's hips, so as not to inhibit normal lifting styles and motion and not interfere with the wearer's hands or workspace. The shelf would be attached to the front of the waist belt and could be made of a rigid material or semi-rigid material such as a foam or flexible plastic. A shoulder light they also be provided when working in areas that have poor lighting.

In other embodiments, the present invention provides a spring design for applying force to the legs. Large die springs are encased in the rectangular beams. A bowden cable is anchored at the bottom of the spring and wraps around the white pulley. The white pulley controls how much the spring is compressed and thus how much force is applied and returned to the user. In this example, the part of the exoskeleton supporting the back could be made of carbon fiber or another leaf spring or could be made from a more rigid material.

A key part of the design is energy return members. The energy return members may be flexible rods, bars beams or spines that are located along the spine of the user. Since the energy return members bend in a continuous manner, the exoskeleton following the spine's curvature will provide support during all angles and will stay close to the body at all times.

In other embodiments, the energy return members may be flexible beams that can be made of carbon fiber, fiberglass, or other flexible materials like wood or spring steel. Carbon fiber has a very high energy return and is very lightweight, while fiberglass is less expensive.

Carbon fiber beams are a rigid material composed of carbon fibers and a resin. By laminating layers of carbon fiber and using a resin to adhere each layer, a high energy, highly deformable beam is the result. Utilizing 1.8 mm thick unidirectional carbon fiber beams results in the ability to achieve large deflections without breaking given the expected curvature of the back. Carbon fiber naturally wants to return to its lowest energy state, which is straight. When loading the beams then by bending (i.e. lifting) energy is built up. Inversely, as the user stands, the beams straighten and return the built-up energy. The beams could be pre-shaped to curve away from the body for extra energy return, or could be contoured to match the back in either the up-down or side-side directions. In a preferred embodiment, the beams may be rectangular in cross-section, which are easily available, but circular beams would permit the wearer to bend to the sides more easily than the current version.

In use, there is a need to have a high energy return when the user bends forward and returns to a vertical posture. To achieve this, the beams (leaf springs) are made of a material with low hysteresis; additionally, it is necessary to create a low-friction contact between the back brace and leaf spring and thigh braces and leaf spring. Some options for this low-friction contact are teflon blocks; sheets of teflon wrapped around an aluminum frame (shown below); or using a shaft supported by a bearing on each side, so that the shaft would roll along the carbon fiber as the person bends.

Note that if the person twists while bending the carbon fiber may push to the sides of the back brace.

There needs to be a sliding or rolling contact between the back brace or thigh braces and leaf spring because the leaf spring is not aligned with the wearer's spine or hip center of rotation, so the length changes as they bend. Permitting the junction between the back brace and leaf spring (or thigh brace and leaf spring) to slide or move accommodates this, while maintaining beneficial forces on the wearer that pull primarily perpendicular to the body as opposed to compressing the spine or legs toward the waist.

As shown in FIG. 3, force 300 on the back clearly has a direction more perpendicular to the body. The embodiments of the present invention reply a vertical force which allows the user to return to a standing position without causing further spinal compression.

It is desirable to have pivot points between the legs and waist belt to permit side-to-side (lateral) leg motion and to permit the user to twist when they bend forward. Additional degrees of freedom that will permit leg motion in the other directions readily may also be beneficial.

Ideally the pivot point (in the frontal plane) for the leg pieces would be level with or above where the back leaf spring pieces attach to the waist belt. As shown in FIG. 4, having everything in line (option 1) emulates a single carbon fiber beam going from the leg to the back. This will provide a higher energy return and less reaction forces centered at the hips. Having the leg pieces below the point at which the back attaches to the waist belt (option 2) emulates having a carbon fiber beam with a rigid section in the middle. This is less ideal because the carbon fiber must then bend at sharper angles where it exits the rigid section in order to accommodate the body's curvature. This puts higher stress on the carbon fiber at these locations, making thinner beams necessary there which will not store energy as efficiently. Having the leg pieces attach at a point above where the back pieces attach to the waist belt, so there is a small segment where the leg and back carbon fiber are both present at the same horizontal height (option 3), is beneficial since it reduces the stress in the carbon fiber.

To accommodate walking, the thigh straps can be loosened. Or, the junction between the leg pieces and the waist belt can also have a hinge joint so that the leg pieces are permitted to bend outward (to the back of the person) at the hinge. So, when the legs move backward, there is no resistance to the motion since the motion occurs at the hinge rather than with the carbon fiber bending.

However, if the junction between the back carbon fiber and the leg carbon fiber is positioned at the point on the wearer's waist that stays horizontal, then the back carbon fiber will do the majority of the bending when the wearer bends their back (e.g. in a stoop lift) while the leg carbon fiber will do the majority of the bending when the wearer bends their legs (e.g. while walking). This can cause the exoskeleton to resist the back's bending but still make it easier to move the legs, assuming that the amount of carbon fiber in the back and legs is adjusted properly.

One possible mechanism for attaching the legs to the back is to have a ball joint between the leg pieces and the waist belt, with a hard stop on the side the body is on so the beams cannot bend forward but can bend backward and sideways as needed to permit the person to move freely in those directions. Also the leg pieces may be angled outward, away from the body to begin with to give the system a bit of preload, so there is more stored energy when someone bends.

It is not necessary to have the leg pieces pivot at all: in this case, there could be two long beams extending from the wearer's legs up to their back (such that there are two separate beams on their back). This will reduce a lot of the device complexity and cost, while possibly making it more difficult to move the legs laterally or to twist the torso.

Yet another possibility is to have custom-made carbon fiber or fiberglass beams, such that they are thin in certain locations and thick in other locations, in order to permit flexing in one location or another preferentially. For example, there could be a single structure where carbon fiber beams are 1.8 mm thick as usual at the back of the legs, but then taper in width as they get close to the waist. This would permit them to bend laterally easily, permitting the legs to move to the sides, without requiring a discrete pivot point made out of metal. Or, the beams at the legs could merge with the back beam into a single structure without any intermediate metal piece. The carbon fiber at the back could be comprised of round beams to permit bending in any direction, or the beams could be thicker at the top (by the person's head) than at the waist, to concentrate any bending closer to the waist where possibly more energy return could be provided.

Other embodiments include having two beams at the back separated by some distance or could have a wide plate of carbon fiber or some other material covering the entire back. This will restrict the wearer from twisting, which may be desirable if the suit should prevent motions that may cause injury. On the other hand, in most cases it is desirable to permit a full range of motion so the carbon fiber should be located near the center of the back.

Additional asymmetrical motion can be enabled by incorporating a vertical pivot point for the legs.

FIGS. 5A and 5B show yet another possible implementation. System 500 includes shoulder harness 501 waist harness 502 and thigh harnesses 503 and 504 as wells as energy return members 510-511 and 560-561. Pivots 600-604 are at the back of the body and also at the side of the hip. Pivots 600 and 602 at the back permitting leg motion in the frontal plane could be located lower on the body, closer to the actual leg pivot point in the frontal plane. On the side of the leg, there could be carbon fiber beams or there could be rigid plastic or metal pieces extending down the leg. In the latter option, the back carbon fiber would be the primary source of bending in the structure, or there could be a separate spring located around the pivot point at the side of the body. This overall geometry could also include any of the mechanisms that provided a differential between the legs or clutches based on torso lean described earlier in the document; in many of these cases, the pivot on the side of the leg would be responsible for permitting the legs to move with respect to the back (e.g. to permit walking or sitting).

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiments, methods, and examples, but by all embodiments and methods within the scope and spirit of the disclosure.

What is claimed is:

1. An exoskeleton to assist a user in moving as object comprising:
   an upper body harness, a mid-body harness, and a lower body harness;
   a first set and second set of elongated energy return members, said first set of energy return members extend between and are affixed to said upper body harness and mid-body harness, said second set of energy return members extend between and are affixed to said lower body harness and mid-body harness;
   said energy return members are formed from carbon fibers; and
   wherein said energy return members are adapted to provide energy to assist a user in moving an object.

2. The exoskeleton of claim 1 wherein said exoskeleton is adapted to enable a user to pick up objects up to around 25-30% of their body weight.

3. The exoskeleton of claim 1 wherein said exoskeleton is adapted to offset the weight of a user's torso when the user bends forward at the waist.

4. The exoskeleton of claim 1 wherein said exoskeleton is adapted to assist a user to stand straight after squatting.

5. The exoskeleton of claim 1 wherein said exoskeleton is adapted to assist a user to stand straight after squatting.

\* \* \* \* \*